(12) United States Patent
Innan et al.

(10) Patent No.: US 7,380,032 B2
(45) Date of Patent: *May 27, 2008

(54) STORAGE SYSTEM, AND METHOD FOR CONTROLLING THE SAME

(75) Inventors: Masataka Innan, Odawara (JP); Akinobu Shimada, Chigasaki (JP); Hideo Tabuchi, Odawara (JP); Toshio Nakano, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 147 days.

This patent is subject to a terminal disclaimer.

(21) Appl. No.: 11/259,855

(22) Filed: Oct. 26, 2005

(65) Prior Publication Data

US 2006/0036777 A1 Feb. 16, 2006

Related U.S. Application Data

(63) Continuation of application No. 10/661,154, filed on Sep. 12, 2003, now Pat. No. 7,231,465.

(30) Foreign Application Priority Data

Sep. 18, 2002 (JP) ............................. 2002-271595

(51) Int. Cl.
*G06F 13/12* (2006.01)
(52) U.S. Cl. ............................ 710/74; 710/36; 710/40; 709/217; 711/202
(58) Field of Classification Search ..................... None
See application file for complete search history.

(56) References Cited

U.S. PATENT DOCUMENTS 3,771,137 A 11/1973 Barner et al.
4,025,904 A 5/1977 Adney et al.
4,710,868 A 12/1987 Cocke et al.
5,155,845 A 10/1992 Beal et al.
5,408,465 A 4/1995 Gusella et al.

(Continued)

FOREIGN PATENT DOCUMENTS

EP 0670551 A1 9/1995

(Continued)

OTHER PUBLICATIONS

Meggyesi "Fibre Channel Overview," High Speed Interconnect project European Laboratory of Particle Physics (CERN) web page http://hsi.web.cern.ch (Aug. 1994).

(Continued)

*Primary Examiner*—Kim Huynh
*Assistant Examiner*—Eron Sorrell
(74) *Attorney, Agent, or Firm*—Mattingly, Stanger, Malur & Brundidge, P.C.

(57) ABSTRACT

Disclosed is a method A method for controlling a storage system including a host computer; a first storage controller connected communicably to the host computer, for receiving a data frame transmitted from the host computer and executing data input to and data output from a first storage device in response to a data input/output request described in the data frame; and a second storage controller connected communicably to the first storage controller, comprising relaying by the first storage controller, upon receipt of the data frame transmitted from the host computer, the data frame to the second storage controller in response to information described in the data frame.

4 Claims, 9 Drawing Sheets

U.S. PATENT DOCUMENTS

| | | |
|---|---|---|
| 5,459,857 A | 10/1995 | Ludlam et al. |
| 5,504,882 A | 4/1996 | Chai et al. |
| 5,548,712 A | 8/1996 | Larson et al. |
| 5,574,950 A | 11/1996 | Hathorn et al. |
| 5,680,580 A | 10/1997 | Beardsley et al. |
| 5,680,640 A | 10/1997 | Ofek et al. |
| 5,758,118 A | 5/1998 | Choy et al. |
| 5,809,285 A | 9/1998 | Hilland |
| 5,835,954 A | 11/1998 | Duyanovich et al. |
| 5,870,537 A | 2/1999 | Kern et al. |
| 5,895,485 A | 4/1999 | Loechel et al. |
| 5,917,723 A | 6/1999 | Binford |
| 5,956,750 A | 9/1999 | Yamamoto et al. |
| 5,978,890 A | 11/1999 | Ozawa et al. |
| 6,012,123 A | 1/2000 | Pecone et al. |
| 6,044,444 A | 3/2000 | Ofek |
| 6,098,129 A | 8/2000 | Fukuzawa et al. |
| 6,101,497 A | 8/2000 | Ofek |
| 6,108,748 A | 8/2000 | Ofek et al. |
| 6,173,374 B1 | 1/2001 | Heil et al. |
| 6,195,730 B1 | 2/2001 | West |
| 6,209,002 B1 | 3/2001 | Gagne et al. |
| 6,219,753 B1 | 4/2001 | Richardson |
| 6,230,239 B1 | 5/2001 | Sakaki et al. |
| 6,240,486 B1 | 5/2001 | Ofek et al. |
| 6,240,494 B1 | 5/2001 | Nagasawa et al. |
| 6,247,099 B1 | 6/2001 | Skazinski et al. |
| 6,247,103 B1 | 6/2001 | Kern et al. |
| RE37,305 E | 7/2001 | Chang et al. |
| 6,341,329 B1 | 1/2002 | LeCrone et al. |
| 6,356,977 B2 | 3/2002 | Ofek et al. |
| 6,363,462 B1 | 3/2002 | Bergsten et al. |
| 6,446,141 B1 | 9/2002 | Nolan et al. |
| 6,446,175 B1 | 9/2002 | West et al. |
| 6,453,354 B1 | 9/2002 | Jiang et al. |
| 6,457,109 B1 | 9/2002 | Milillo et al. |
| 6,457,139 B1 | 9/2002 | D'Errico et al. |
| 6,480,934 B1 | 11/2002 | Hino et al. |
| 6,484,173 B1 | 11/2002 | O'Hare et al. |
| 6,490,659 B1 | 12/2002 | McKean et al. |
| 6,523,096 B2 | 2/2003 | Sanada et al. |
| 6,529,976 B1 | 3/2003 | Fukuzawa et al. |
| 6,553,408 B1 | 4/2003 | Merrell et al. |
| 6,560,673 B2 | 5/2003 | Elliot |
| 6,587,935 B2 | 7/2003 | Ofek |
| 6,598,134 B2 | 7/2003 | Ofek et al. |
| 6,622,220 B2 | 9/2003 | Yoshida et al. |
| 6,640,278 B1 | 10/2003 | Nolan et al. |
| 6,640,291 B2 | 10/2003 | Fujibayashi |
| 6,647,387 B1 | 11/2003 | McKean et al. |
| 6,647,474 B2 | 11/2003 | Yanai et al. |
| 6,647,476 B2 | 11/2003 | Nagasawa et al. |
| 6,654,830 B1 | 11/2003 | Taylor et al. |
| 6,654,831 B1 | 11/2003 | Otterness et al. |
| 6,675,258 B1 | 1/2004 | Bramhall et al. |
| 6,675,268 B1 | 1/2004 | DeKonig et al. |
| 6,681,303 B1 | 1/2004 | Watabe et al. |
| 6,681,339 B2 | 1/2004 | McKean et al. |
| 6,684,310 B2 | 1/2004 | Anzai et al. |
| 6,697,367 B1 | 2/2004 | Halstead et al. |
| 6,708,232 B2 | 3/2004 | Obara |
| 6,718,404 B2 | 4/2004 | Reuter et al. |
| 6,745,281 B1 | 6/2004 | Saegusa |
| 6,772,315 B1 | 8/2004 | Perego |
| 6,799,255 B1 | 9/2004 | Blumenau |
| 6,816,948 B2 | 11/2004 | Kitamura et al. |
| 6,826,778 B2 | 11/2004 | Bopardikar et al. |
| 6,851,020 B2 | 2/2005 | Matsumoto et al. |
| 6,857,057 B2 | 2/2005 | Nelson et al. |
| 6,876,656 B2 | 4/2005 | Brewer et al. |
| 6,883,064 B2 | 4/2005 | Yoshida et al. |
| 6,922,761 B2 | 7/2005 | O'Connell et al. |
| 6,973,549 B1 | 12/2005 | Testardi et al. |
| 6,976,103 B1 | 12/2005 | Watanabe et al. |
| 6,976,134 B1 | 12/2005 | Lolayekar et al. |
| 2001/0050915 A1 | 12/2001 | Ohare et al. |
| 2001/0052018 A1 | 12/2001 | Yokokura |
| 2001/0054133 A1 | 12/2001 | Murotani et al. |
| 2002/0004857 A1 | 1/2002 | Arakawa et al. |
| 2002/0004890 A1 | 1/2002 | Ofek et al. |
| 2002/0019908 A1 | 2/2002 | Reuter et al. |
| 2002/0019920 A1 | 2/2002 | Reuter et al. |
| 2002/0019922 A1 | 2/2002 | Reuter et al. |
| 2002/0019923 A1 | 2/2002 | Reuter et al. |
| 2002/0026558 A1 | 2/2002 | Reuter et al. |
| 2002/0029326 A1 | 3/2002 | Reuter et al. |
| 2002/0065864 A1 | 5/2002 | Hartsell et al. |
| 2002/0087544 A1 | 7/2002 | Selkirk et al. |
| 2002/0087751 A1 | 7/2002 | Chong, Jr. |
| 2002/0103889 A1 | 8/2002 | Markson et al. |
| 2002/0112113 A1 | 8/2002 | Karpoff et al. |
| 2002/0124108 A1 | 9/2002 | Terrell et al. |
| 2002/0133735 A1 | 9/2002 | McKean et al. |
| 2002/0156887 A1 | 10/2002 | Hashimoto |
| 2002/0156984 A1 | 10/2002 | Padovano |
| 2002/0156987 A1 | 10/2002 | Gajjar et al. |
| 2002/0178328 A1 | 11/2002 | Honda et al. |
| 2002/0178335 A1 | 11/2002 | Selkirk et al. |
| 2002/0188592 A1 | 12/2002 | Leonhardt et al. |
| 2002/0194428 A1 | 12/2002 | Green |
| 2002/0194523 A1 | 12/2002 | Ulrich et al. |
| 2003/0037071 A1 | 2/2003 | Harris et al. |
| 2003/0051109 A1 | 3/2003 | Cochran |
| 2003/0056038 A1 | 3/2003 | Cochran |
| 2003/0079018 A1 | 4/2003 | Lolayekar et al. |
| 2003/0079019 A1 | 4/2003 | Lolayekar et al. |
| 2003/0093541 A1 | 5/2003 | Lolayekar et al. |
| 2003/0093567 A1 | 5/2003 | Lolayekar et al. |
| 2003/0097607 A1 | 5/2003 | Bessire |
| 2003/0101228 A1 | 5/2003 | Busser et al. |
| 2003/0105931 A1 | 6/2003 | Weber et al. |
| 2003/0115218 A1 | 6/2003 | Bobbitt et al. |
| 2003/0115432 A1 | 6/2003 | Biessener et al. |
| 2003/0126327 A1 | 7/2003 | Pesola et al. |
| 2003/0145168 A1 | 7/2003 | LeCrone et al. |
| 2003/0145169 A1 | 7/2003 | Nagasawa |
| 2003/0158999 A1 | 8/2003 | Hauck et al. |
| 2003/0163553 A1 | 8/2003 | Kitamura et al. |
| 2003/0167419 A1 | 9/2003 | Yanai et al. |
| 2003/0182525 A1 | 9/2003 | O'Connell |
| 2003/0189936 A1 | 10/2003 | Terrell et al. |
| 2003/0200387 A1 | 10/2003 | Urabe et al. |
| 2003/0204597 A1 | 10/2003 | Arakawa et al. |
| 2003/0204700 A1 | 10/2003 | Biessener et al. |
| 2003/0212854 A1 | 11/2003 | Kitamura et al. |
| 2003/0212860 A1 | 11/2003 | Jiang et al. |
| 2003/0221077 A1 | 11/2003 | Ohno et al. |
| 2003/0229645 A1 | 12/2003 | Mogi et al. |
| 2003/0229764 A1 | 12/2003 | Ohno et al. |
| 2004/0003022 A1 | 1/2004 | Garrison et al. |
| 2004/0028043 A1 | 2/2004 | Maveli et al. |
| 2004/0049553 A1 | 3/2004 | Iwamura et al. |
| 2004/0054850 A1 | 3/2004 | Fisk et al. |
| 2004/0054866 A1 | 3/2004 | Blumenau et al. |
| 2004/0064610 A1 | 4/2004 | Fukuzawa et al. |
| 2004/0064641 A1 | 4/2004 | Kodama |
| 2004/0068637 A1 | 4/2004 | Nelson et al. |
| 2004/0073831 A1 | 4/2004 | Yanai et al. |
| 2004/0098547 A1 | 5/2004 | Ofek et al. |
| 2004/0111485 A1 | 6/2004 | Mimatsu et al. |
| 2004/0123180 A1 | 6/2004 | Soejima et al. |
| 2004/0139237 A1 | 7/2004 | Rangan et al. |
| 2004/0143832 A1 | 7/2004 | Yamamoto et al. |
| 2004/0148443 A1 | 7/2004 | Achiwa |

| | | | |
|---|---|---|---|
| 2004/0158652 A1 | 8/2004 | Obara | |
| 2004/0158673 A1 | 8/2004 | Matsunami et al. | |
| 2004/0172510 A1 | 9/2004 | Nagashima et al. | |
| 2004/0230980 A1 | 11/2004 | Koyama et al. | |
| 2004/0260875 A1 | 12/2004 | Murotani et al. | |
| 2004/0260966 A1 | 12/2004 | Kaiya et al. | |
| 2005/0010734 A1 | 1/2005 | Soejima et al. | |
| 2005/0010743 A1 | 1/2005 | Tremblay et al. | |
| 2005/0033878 A1 | 2/2005 | Pangal et al. | |
| 2005/0055501 A1 | 3/2005 | Guha et al. | |
| 2005/0081009 A1 | 4/2005 | Williams et al. | |
| 2005/0138184 A1 | 6/2005 | Amir et al. | |

FOREIGN PATENT DOCUMENTS

| | | |
|---|---|---|
| EP | 0670551 A1 | 9/1995 |
| JP | 09-288547 | 11/1997 |
| JP | 10-283272 A | 10/1998 |
| JP | 11-065980 A | 3/1999 |
| JP | 2000-293317 A | 10/2000 |
| JP | 2001-067187 A | 3/2001 |
| JP | 2002-157091 A | 5/2002 |
| JP | 2002-230246 A | 8/2002 |
| WO | 9425919 | 11/1994 |
| WO | 9425919 A1 | 11/1994 |
| WO | WO03/023640 | 3/2003 |
| WO | 03027886 | 4/2003 |
| WO | 03030431 | 4/2003 |
| WO | 03030449 | 4/2003 |

OTHER PUBLICATIONS

"Celerra Data Migration Service (CDMS)," White Paper, EMC Corporation Hopkinton, MA (Jan. 2002).

"Data Migration Solution Transferring Data Between Storage Systems over Fibre-channel or SCSI Connections," SANRAD Application Note: APP-003-03, SANRAD Inc. San Mateo, CA (2003).

"Migrating Individual Servers to an iSCSI SAN," SANRAD Application Note:APP-004-0 1, SANRAD Inc. San Mateo, CA (2003).

"Network Attached Storage in the Data Protection Environment," Sony Electronics Inc. (Feb. 2002).

Anderson et al. "Hippodrome: Running Circles Around Storage Administration," Proceedings of the 1st USENIX Conference on File and Storage Technologies (Jan. 2002).

Sarkar et al. "Internet Protocol storage area networks," IBM Systems Journal 42: 218-231 (2003).

Sicola "SCSI-3 Fault Tolerant Controller Configurations Utilizing SCC & New Event Codes," T10 Committee of the International Committee on Information Technology Standards (INCITS), X3T10 95 (Oct. 1995).

E. van der Big, "Fibre Channel Overview", Aug. 15, 1994m his.web.cern.ch/HIS/fcs/spec/overview.htm, pp. 1-10.

FIG. 2
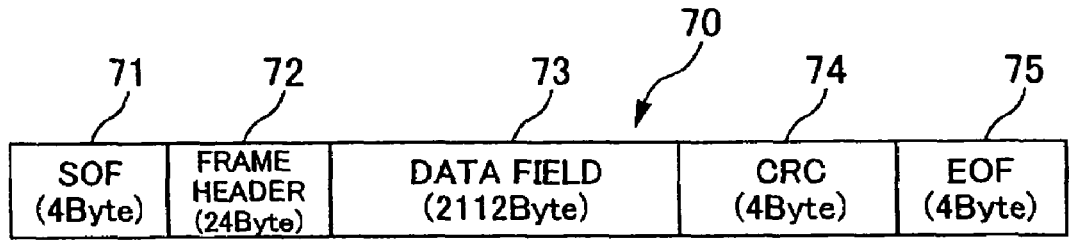
FIG. 3
| Byte \ Bit | 31-24 | 23-16 | 15-8 | 7-0 |
|---|---|---|---|---|
| 0 | R_CTL | DESTINATION_ID | | |
| 1 | Reserved | SOURCE_ID | | |
| 2 | TYPE | F_CTL | | |
| 3 | SEQ_ID | DF_CTL | SEQ_CNT | |
| 4 | OX_ID | | RX_ID | |
| 5 | PARAMETER | | | |
81 — DESTINATION_ID row
82 — SOURCE_ID row
FIG. 4
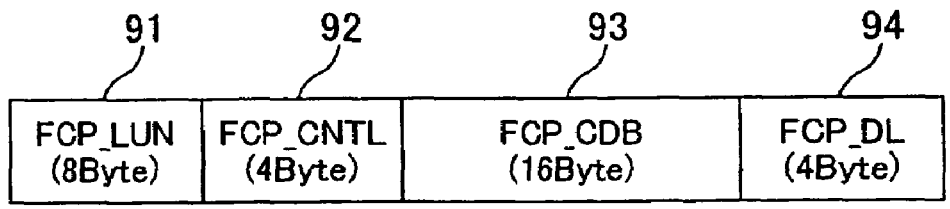

FIG. 6

LUN CONTROL TABLE

| LUN | FIRST STORAGE CONTROLLER | SECOND STORAGE CONTROLLER |
|---|---|---|
| 0001 | ○ | |
| 0002 | ○ | |
| 0003 | | ○ |
| 0004 | | ○ |

FIG. 7

ACCESS LIMIT MANAGEMENT TABLE

| Destination_ID | Source_ID | LUN |
|---|---|---|
| 522 | 124 | 0001 |
| 522 | 124 | 0002 |
| 525 | 153 | 0014 |
| 525 | 153 | 0015 |
| . | . | . |
| . | . | . |

FIG. 9

PRIORITY MANAGEMENT TABLE

| Destination_ID | Source_ID | DELAY TIME(SEC.) |
|---|---|---|
| 522 | 124 | 100 |
| 523 | 124 | 150 |
| 525 | 153 | 100 |
| . | . | . |
| . | . | . |

FIG. 11

PAIR MANAGEMENT TABLE

| LUN(MAIN) | LUN(SUB) |
|---|---|
| 0001 | 0003 |
| 0002 | 0004 |
| . | . |
| . | . |

STORAGE SYSTEM, AND METHOD FOR CONTROLLING THE SAME

CROSS-REFERENCE TO RELATED APPLICATIONS

This application claims priority upon Japanese Patent Application No. 2002-271595 filed on Sep. 18, 2002 in Japan, which is herein incorporated by reference.

BACKGROUND OF THE INVENTION

1. Field of the Invention

The present invention relates to a method for controlling a storage system, a storage controller and a storage system.

2. Description of the Related Art

The environment surrounding information systems is rapidly changing such as the progress of IT technology and shifting to broadband. Along with this, measures against the rapid increase of the amount of data handled are seriously required. Therefore, the storage systems operating in data centers are being subjected to prompt shifting to larger capacities and higher performances of the storage controllers such as disk array apparatuses.

To increase the storage area, a disk array apparatus can additionally be provided for example. However, accordingly as the number of the disk array apparatuses installed increases the load of management on the host computer side is inevitably increased, which may affect running of applications on the host computer side. Furthermore, recently, so-called "virtualization" is in progress that is a technology for managing a huge storage area efficiently without making users aware of the hardware configuration as far as possible. However, the virtualization may cause an increase of the load of processing on the host computer side.

In view of such circumstances, it is expected that the need for the technology for reducing the load of processing on the host computer side will become greater and greater. A technology is thus being sought that ensures larger capacities and higher performances of storage controllers without increasing the load of processing on the host computer side.

SUMMARY OF THE INVENTION

The present invention was conceived on the basis of the above background and one object thereof is to provide a method for controlling a storage system, a storage controller and a storage system.

A storage system according to one aspect of the present invention to achieve the above and other objects comprises a host computer; a first storage controller connected communicably to the host computer, for receiving a data frame transmitted from the host computer and executing data input to and data output from a first storage device in response to a data input/output request described in the data frame; and a second storage controller connected communicably to the first storage controller, for receiving a data frame transmitted from the host computer to the first storage controller and relayed by the first storage controller and executing data input to and data output from a second storage device in response to a data input/output request described in the data frame, wherein when the first storage controller receives the data frame transmitted from the host computer the first storage controller relays the data frame to the second storage controller in response to information described in the data frame.

According to the present invention there can be provided a method for controlling a storage system, a storage controller and a storage system.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein:

FIG. 2 illustrates the structure of a data frame on a Fiber Channel according to one embodiment of the present invention;

FIG. 3 illustrates the structure of a frame header according to one embodiment of the present invention;

FIG. 4 illustrates the structure of FCP_CMND according to one embodiment of the present invention;

FIG. 6 shows an LUN management table according to one embodiment of the present invention;

FIG. 7 shows an access limit management table according to one embodiment of the present invention;

FIG. 9 shows a priority management table according to one embodiment of the present invention;

FIG. 11 shows a pair management table according to one embodiment of the present invention.

DETAILED DESCRIPTION OF THE INVENTION

Figure 1:
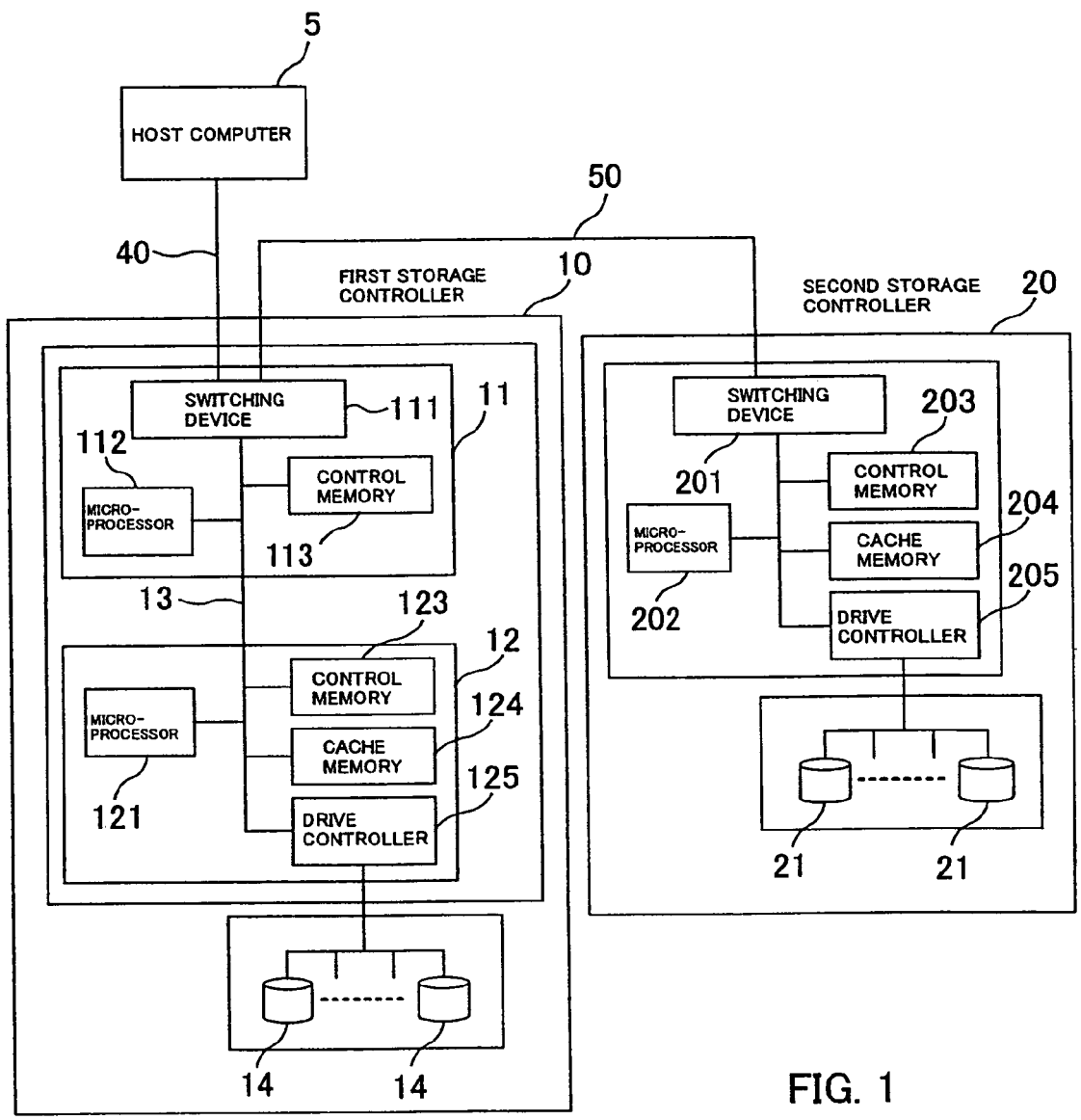
FIG. 1 illustrates the configuration of a storage system according to one embodiment of the present invention.

At least the following matters will be made clear by the explanation in the present specification and the description of the accompanying drawings.

SUMMARY OF THE DISCLOSURE

A method for controlling a storage system, the storage system comprises a host computer; a first storage controller connected communicably to the host computer, for receiving a data frame transmitted from the host computer and executing data input to and data output from a first storage device in response to a data input/output request described in the data frame; and a second storage controller connected communicably to the first storage controller, for receiving a data frame transmitted from the host computer to the first storage controller and relayed by the first storage controller and executing data input to and data output from a second storage device in response to a data input/output request described in the data frame, wherein when the first storage controller receives the data frame transmitted from the host computer the first storage controller relays the data frame to the second storage controller in response to information described in the data frame.

In this method, the second storage controller is connected to the first storage controller such that the data frame transmitted from the host computer is received temporarily by the first storage controller and is transmitted by the first storage controller to the second storage controller in response to information described in the data frame. In this configuration, the host computer transmits the data frame to the first storage controller indiscriminately regardless of whether the data frame that the host computer is going to transmit is directed to the first storage controller or to the second storage controller. Therefore, the host computer has no need to communicate directly with the second storage controller when transmitting the data frame and the load of processing in the host computer can be reduced by the amount to be produced by the direct communication, compared to the scheme in which a host computer executes direct communications with the second storage controller.

A function for relaying the data frame to the second storage controller in response to information described in the data frame when the data frame transmitted from the host computer has been received can be realized by, for example, a program that is run on the first storage controller.

The data frame is, for example, a data frame conforming to Fiber Channel Protocol. The relaying is executed by a Fiber Channel switch included in the first storage controller.

The information is at least one of information for specifying a Fiber Channel port of the source of the data frame, information for specifying a Fiber Channel port of the destination of the data frame and information for specifying a storage device. Among these, the information for specifying a Fiber Channel port of the source is, for example, Source_ID described later. The information for specifying a Fiber Channel port of the destination is, for example, Destination_ID described later. The information for specifying a storage device is, for example, FCP_LUN described later.

The storage device is, for example, a logic volume organized in zones on a storage area provided by a disk drive or a physical storage area provided by a disk drive.

In this method, the first storage controller functions rather as a network switch which either receives by itself the data frame transmitted from the host computer or relays the data frame to the second storage controller. Then, because the first storage controller functions as a network switch, an applied operation can be easily provided in which the information and the functions possessed by the first storage controller are combined with the function as a network switch. Therefore, functions such as, for example, access limit function, priority control, double management of data, described later, can be easily provided. Not limited to these functions, various functions can be easily realized which are obtained by combining the function as the network switch and the functions that the first storage controller originally has as a storage controller.

Furthermore, when the virtualization technology is applied to the storage system, a plurality of storage devices are managed virtually unitarily as one device and/or management/operation of functions such as remote copy and data copy management are consolidated. By being provided with such functions, influence on the resource consumption and the processing rate on the host computer side becomes inevitable. However, by making available the provision of the functions formed by combining the functions that the first storage controller originally has as a storage controller and the function as that of a network switch by providing the first storage controller with the function as that of a network switch as described above, it is possible to provide the functions that have been originally included in the host computer, to the side of the first storage controller, to minimize the resource consumption and the load of processing on the host computer side and to provide a system supporting the virtualization.

Furthermore, when a general-purpose switch such as a Fiber Channel switch is used as the network switch, the first storage controller and the second storage controller can be easily connected even though those storage controllers are different models or are from different manufacturers. Therefore, the storage system can be easily configured and full use of resources such as existing or obsolete storage controllers can be progressed. In addition, in embodiments of (i) basic operations, (ii) access limit function, (iii) priority control and (iv) data copy management, full use of a plurality of storage controllers can be progressed by connecting one storage controller provided with these functions to a plurality of storage controllers not provided with these functions.

In the data frame, as the information, at least one of information for specifying a Fiber Channel port of the source of the data frame, information for specifying a Fiber Channel port of the destination of the data frame and information for specifying a storage device, is described. The first storage controller stores access limit information indicating whether an access of a Fiber Channel port of the source to a Fiber Channel port or a storage device of the destination is permitted or not permitted. Therefore, it can be arranged that, when the first storage controller receives the data frame from the host computer, the first storage controller refers to the access limit information to check whether an access of a Fiber Channel port of the source of the data frame to a Fiber Channel port of the destination or a storage device of the destination is permitted and relays the data frame to the second storage controller only when the access is permitted.

In this manner, the first storage controller judges based on the access limit information whether the first storage controller should transmit the data frame to the second storage controller and, thus, the first storage controller executes replacing the role of the second storage controller the process relating to the access limit of the data frame directed to the second storage controller. Therefore, it is enough that the function for processing an access limit is implemented only on the first storage controller, and the load of maintenance is reduced by the amount to be created by taking the trouble of providing such a mechanism to the second storage controller. The function of the first storage controller relating to the access limit is realized by, for example, a program that is run on the first storage controller.

Since there is no need for the second storage controller to be provided with access limit function, a storage controller having lower performance than that of the first storage controller can be used as the second storage controller and, therefore, the introduction cost and the operation cost can be reduced. Furthermore, old types of storage controllers having lower performance compared to the newly introduced storage controllers can be fully used as second storage controllers. Yet furthermore, it is enough that the access limit management table is stored only in the first storage controller and, therefore, reduction of the load of maintenance created by the unified management is progressed.

Arrangement may be as follows: in the data frame, as the information, information for specifying a Fiber Channel port of the source of the data frame and information for specifying a Fiber Channel port of the destination of the data frame are described; the first storage controller stores information indicating the priority of data input/output process corresponding to the data frame by relating to combinations of a Fiber Channel port of the source and a Fiber Channel port of the destination; when the first storage controller receives the data frame from the host computer, the apparatus executes data input to and data output from the storage device connected to a port of the destination of the data frame according to the information indicating the priority. The information indicating the priority is, for example, information indicating the timing for executing the data input to and data output from the storage device and, more specifically, a delay time which will be described later.

In this mechanism, it can be considered that the first storage controller executes the priority control function replacing the role of the second storage controller. That is, by only implementing the priority control function on the first storage controller, a priority control can also be executed to the data frame directed to the second storage controller and the load of operation imposed on the second storage controller can be reduced by the amount to be created by providing such a mechanism.

The function of the first storage controller relating to the priority control is realized by, for example, a program that is run on the first storage controller.

Because there is no need for the second storage controller to be provided with priority control function a storage controller having lower processing performance than that of the first storage controller can be used as the second storage controller and, therefore, the introduction cost and the operation cost can be reduced. Furthermore, old types of storage controllers having lower performance compared to the newly introduced storage controllers can be fully used as second storage controllers. Yet furthermore, it is enough that the priority management table is stored only in the first storage controller, thus achieving a reduction of the load of maintenance by the unified management.

A method for controlling a storage system, the storage system comprising a host computer; a first storage controller connected communicably to the host computer, for receiving a data frame transmitted from the host computer and executing data input to and data output from a first storage device in response to a data input/output request described in the data frame; and a second storage controller connected communicably to the first storage controller, for receiving a data frame transmitted from the host computer to the first storage controller and relayed by the first storage controller and executing data input to and data output from a second storage device in response to a data input/output request described in the data frame, wherein the first storage controller stores a copy of data stored in the first storage device which is the object of data input/output effected by the first storage controller, into the second storage device as well which is the object of data input/output effected by the second storage controller, the data frame having therein described information for specifying a Fiber Channel port connected to the first storage device or the second storage device which is the destination of the data frame and information for specifying the storage devices, wherein when the first storage controller receives the data frame in which is described a data writing request for the first storage device the first storage controller executes writing of data on that data frame to the first storage device while simultaneously the first storage controller creates a data frame in which the information for specifying the Fiber Channel port and the information for specifying the storage devices described in the data frame are rewritten such that the object is the second storage device, the first storage controller transmitting the created data frame to the second storage controller, and wherein the second storage controller receives the data frame and executes writing of data on that data frame to the second storage device, to thereby store a copy of the data stored in the first storage device into the second storage device as well that is the object of data input/output effected by the second storage controller.

According to this method, a mechanism for data copy management in which data stored in the first storage device is stored into the second storage device as well can be easily realized only by providing a mechanism for creating a data frame as described above in the first storage controller.

It is to be noted that the function of the first storage controller relating to the data copy management is realized by, for example, a program that is run on the first storage controller.

The Configuration of the Storage System

The configuration of a storage apparatus system (storage system) described as an embodiment of the present invention is illustrated in FIG. 1. The storage system is operated in, for example, a data center. A host computer 5 and a first storage controller 10 are connected through first communication means 40 conforming to Fiber Channel Protocol. The host computer 5 is a computer such as, for example, a personal computer, a workstation and a general-purpose computer. The first storage controller 10 and a second storage controller 20 are connected through second communication means 50 conforming to the Fiber Channel Protocol.

The first storage controller 10 includes a switching control unit 11 and a storage device control unit 12. The switching control unit 11 and the storage device control unit 12 are connected by an internal communication path 13 such as an internal bus.

The switching control unit 11 comprises a switching device 111, a microprocessor 112, and a control memory 113 such as a ROM, a RAM, etc. The switching device 111 is provided with functions as a Fiber Channel switch (hereinafter referred to as "FC switch") and has a predetermined number of Fiber Channel ports. The switching device 111 receives a data frame transmitted from the host computer 5 and relays the data frame to the storage device control unit 12 or the second storage controller 20. In addition, the switching device 111 also receives a data frame transmitted from the storage device control unit 12 or the second storage controller 20 and relays the data frame to the host computer 5. The microprocessor 112 provides various functions of the switching control unit 11. In addition, the microprocessor 112 controls various components included in the switching control unit 11. Furthermore, the microprocessor 112 controls transmitting/receiving of the data frame conducted at the switching device 111. The control memory 113 is utilized as, for example, a work memory for processes executed by the microprocessor 112, or a storage area for various data such as tables and variables.

The storage device control unit 12 receives a data frame transmitted through the internal communication path 13 and executes data input to and data output from a disk drive 14 in response to a data input/output request described in the data frame. The data input/output processes include a data writing request and a data read-out request. In the following description, data input and output includes the cases where it includes either a data writing request or a data read-out request and where it includes both of a data writing request and a data read-out request.

The microprocessor 121 provides various functions of the storage device control unit 12, and controls the various components included in the storage device control unit 12, etc. A control memory 123 is utilized as, for example, a work memory for the processes executed by the microprocessor 121 and as a storage area for various data such as tables and variables. A cache memory 124 is used as, for example, temporary storage means for data being input to/output from the disk drive 14. A drive controller 125 executes data input/output processes to the disk drive 14. The drive controller 125 may operate the disk drive 14 in RAID (Redundant Array of Inexpensive Disks) scheme. The drive controller 125 manages a physical storage area provided by the disk drive 14 by dividing it into logic volumes that are logic storage areas organized on the physical storage area. A specific identifier called LUN (Logical Unit Number) is given to each logic volume respectively. When an LUN has been designated, one or more disk drives 14 are identified. Furthermore, at least one or more logic volumes are related to one Fiber Channel port and, by designating one Fiber Channel port, all the logic volumes related to it are identified. The disk drive 14 can be held in the same housing as that of the first storage controller 10 or in housing different from that of the first storage controller 10.

The second storage controller 20 comprises a switching device 201, a microprocessor 202, a control memory 203, a cache memory 204, a drive controller 205 and a disk drive 21. The switching device 201 is provided with functions as a Fiber Channel switch (hereinafter referred to as "FC switch") having a plurality of Fiber Channel ports and second communication means 50 is connected to the Fiber Channel ports.

The microprocessor 202 provides various functions of the second storage controller 20 and controls various components included in the second storage controller 20, etc. The control memory 203 is utilized as, for example, a work memory for the processes executed by the microprocessor 202, or a storage area for various data such as tables and variables. The cache memory 204 is used as, for example, temporary storage means for data input to/output from the disk drive 21. The drive controller 205 executes data input/output processes to the disk drive 21.

The drive controller 205 may operate the disk drive 21 in RAID (Redundant Array of Inexpensive Disks) scheme. The drive controller 205 manages a physical storage area provided by the disk drive 21 by dividing it into logic volumes that are logic storage areas organized on the physical storage area. A specific identifier called LUN (Logical Unit Number) is given to each logic volume respectively. When an LUN has been designated, one or more disk drives 21 are identified.

The disk drive 21 can be held in the same housing as that of the second storage controller 20 or in housing different from that of the second storage controller 20.

Data Frame

Next, it will be described the structure of data frames conforming to the Fiber Channel Protocol, that is transmitted and received between the host computer 5, the first storage controller 10 and the second storage controller 20. The details of the Fiber Channel Protocol and data frames conforming to it are described in, for example, "Technical Instruction on Fiber Channel" edited by the Fiber Channel Technical Association, Ronso-sha, etc.

The structure of a data frame 70 on a Fiber Channel is illustrated in FIG. 2. At the head of the data frame 70, an SOF (Start of Frame) (71) of four bytes is placed and, following the SOF, a frame header (72) of 24 bytes, a data field (73) of 2112 bytes and a CRC (Cyclic Redundancy Check) (74) of four bytes are provided. At the tail of the data frame, an EOF (75) of four bytes is placed.

The structure of the frame header (72) of 24 bytes shown in FIG. 2 is illustrates in FIG. 3. Destination_ID (81) is an identifier of the Fiber Channel port being the destination of the data frame and N_Port_ID, N_Port_Name or etc. is described in it. Source_ID (82) is an identifier of the Fiber Channel port of the source of the data frame and N_Port_ID, N_Port_Name or etc. is described in it.

The structure of FCP_CMND (Fiber Channel Protocol for SCSI Command) being one of the payloads of the data field shown in FIG. 2 is illustrated in FIG. 4. In FCP_LUN (FCP LogicaLUNit Number) (91), a LUN of the logic volume to which a SCSI command described in the payload is to be applied. In FCP_CNTL (FCP Control) (92), a command control parameter is described. In FCP_CDB (FCP Command Descriptor Block) (93), a SCSI command CDB (Command Data Block) is described. In FCP_DL (FCP Data Length) (94), the upper limit of the data size that can be converted between an initiator and a target is described.

Basic Operation

Figure 5:
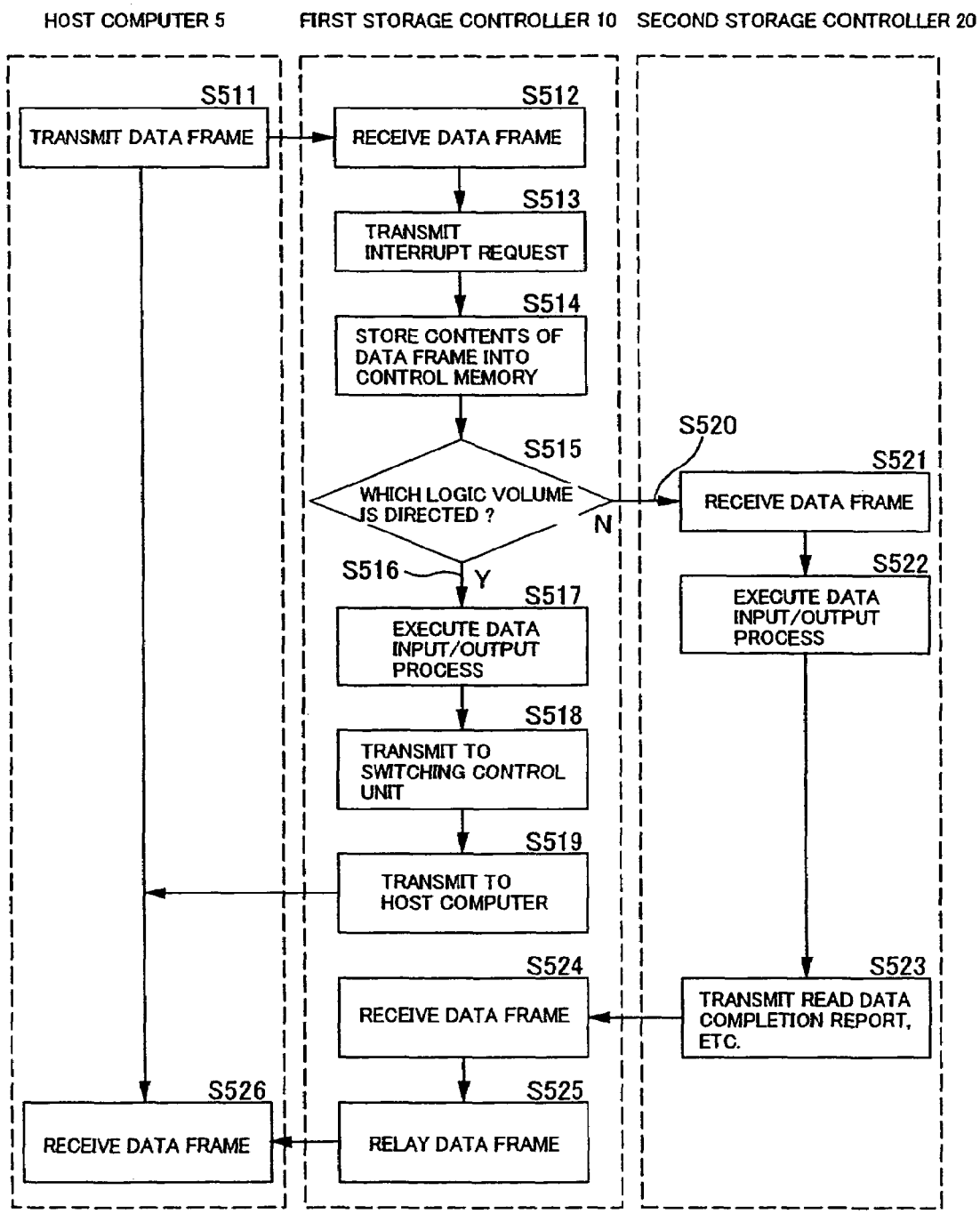
FIG. 5 is a flow chart illustrating the operation of a storage system according to one embodiment of the present invention when a data frame is transmitted from a host computer to a first storage controller.

Next, the operation of the storage system while a data frame is transmitted from the host computer 5 to the first storage controller 10 will be described referring to a flow chart shown in FIG. 5.

First, a data frame is transmitted from the host computer 5 to a Fiber Channel port of the switching device 111 of the first storage controller 10 through the first communication means 40 (S511). When the switching device 111 of the first storage controller 10 receives the data frame (S512), the switching device 111 transmits an interrupt request to the microprocessor 112 (S513). When the microprocessor 112 receives the interrupt request, the microprocessor 112 stores in the control memory 113 the contents of Destination_ID (81), Source_ID (82) and FCP_LUN (91) of the received data frame (S514).

In the control memory 113 of the first storage controller 10, a LUN management table shown in FIG. 6, in which whether the FCP_LUN (91) is directed to a logic volume of the first storage controller 10 or of the second storage controller 20 is described is stored. The microprocessor 112 checks whether the data frame is directed to a logic volume of the first storage controller or of the second storage controller by referring the FCP_LUN (91) of the data frame stored in the control memory 113 to the LUN management table (S615).

Now, if the data frame is directed to a logic volume of the first storage controller 10, the first storage controller 10 transmits the data frame to the storage device control unit 12 through the internal communication path 13 (S516). When the storage device control unit 12 receives the data frame, the storage device control unit 12 executes data input and output corresponding to the SCSI command described in the data frame to the logic volume identified from the contents of FCP_LUN (91) of the data frame (S517). After executing the data input/output process, the first storage controller 10 transmits to the switching control unit 11 the data frame in which the result of the process and data read out from the logic volume etc. are described, when necessary (S518). Then, when the switching device 111 receives the data frame, it transmits the data frame to the host computer 5 (S519).

On the other hand, in (S515), if the data frame received from the host computer 5 is directed to a logic volume of the second storage controller 20, the microprocessor 112 controls the switching device 111 such that the switching device 111 relays the data frame to the second storage controller 20 (S520). When the second storage controller 20 receives the data frame (S521), it executes data input and output corresponding to the SCSI command described in the data frame to a logic volume identified from the contents of FCP_LUN (91) of the data frame (S522).

After executing the data input/output process, the second storage controller 20 transmits to the first storage controller 10 through the second communication means the data frame in which the report of completion, the result of the process or data read out from the logic volume are described, when necessary (S523). In the Destination_ID (81) of the data frame, information for specifying a Fiber Channel port of the host computer 5 is described. When the switching device 111 of the first storage controller 10 receives the data frame (S524), it relays the data frame to the host computer 5 (S525).

As described above, the data frame transmitted from the host computer 5 and input into the switching device 111 of the first storage controller 10, is judged at the switching control unit 11 whether it is directed to the first storage controller 10 or the second storage controller 20 and, if it is directed to the second storage controller 20, the data frame is relayed from the switching device 111 to the second storage controller 20. In other words, the first storage controller 10 receives replacing the role of the second storage controller 20 the data frame that the host computer 5 originally has directed to the second storage controller 20.

Furthermore, by receiving the data frame by the first storage controller 10 replacing the role of the second storage controller 20, the host computer 5 only has to communicate with the first storage controller 10 and the load of processing of the host computer 5 can be reduced by the amount to be created by the communication between the host computer 5 and the second storage controller 20.

Yet furthermore, by managing the LUN management tables unifying at the first storage controller 10, the logic volumes of the first storage controller 10 and the second storage controller 20 can be managed being unified and, therefore, the load of maintenance imposed on work such as updating of the LUN management tables by operators etc. can be reduced. Especially when the disk drive 14 and disk drive 21 are operated while being virtualized, such a unified management scheme considerably contributes to more efficient operation and reduction of the load of operation.

When a disk array apparatus is the one equipped with a very ordinary interface as the connection interface with the host computer 5, like the switching device 201 as described above, the disk array apparatus can be used as the second storage controller 20 of the embodiment and, for example, in a storage system using a disk array apparatus having a higher performance as the first storage controller 10 and a disk array apparatus having a lower performance than the other one as the second storage controller 20, a merit can be produced that the functions of the first storage controller 10 can be applied to the second storage controller 20.

Access Limit Function

Next, the access function included in the first storage controller 10 will be described. The first storage controller 10 stores the access limit management table exemplified in FIG. 7. In the access limit management table, combinations of Destination_ID, Source_ID and LUN, that do not permit any data input/output process are described. The access limit function is a function that does not permit any data input/output process corresponding to a data input/output request described in the data frame when the combination of Destination_ID, Source_ID and LUN described in the data frame received by the first storage controller 10 from the host computer 5 is described in the access limit management table. The contents of the access limit management table may be registered automatically by a function of the first storage controller 10 or may be registered in a manual operation by an operator.

Figure 8:
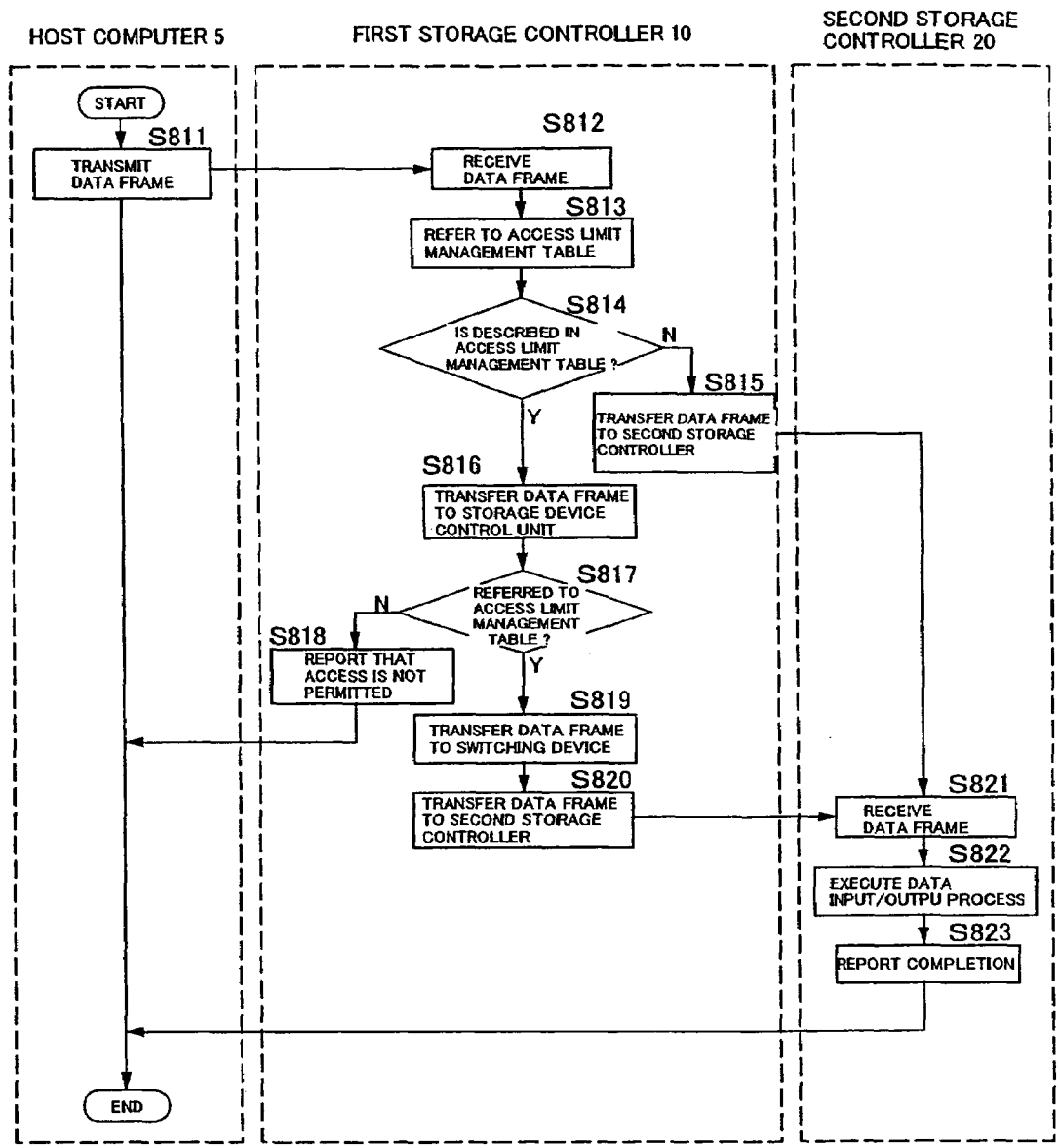
FIG. 8 is a flowchart illustrating an access limit function according to one embodiment of the present invention.

The access limit function will be described in detail referring to the flow chart shown in FIG. 8. This flow chart describes the case where a data frame in which a data input/output request directed to a logic volume of the second storage controller 20 is described is transmitted from the host computer 5 to the first storage controller 10.

When the first storage controller 10 receives a data frame (S812) transmitted from the host computer 5 (S811), the first storage controller 10 checks whether the combination of Destination_ID (81), Source_ID (82) and FCP_LUN (91) in the data frame is described in the access limit management table (S813, S814). If the combination is not described in the access limit management table, the first storage controller 10 relays the data frame to the second storage controller 20 (S815).

On the other hand, If the combination is described, the data frame is transmitted from the switching control unit 11 to the storage device control unit 12 (S816). When the storage device control unit 12 receives the data frame, the storage device control unit 12 refers to the access limit management table in the control memory 113 (S817). If the combination of Destination_ID (81), Source_ID (82) and FCP_LUN (91) in the data frame is a combination not to be permitted the access, the storage device control unit 12 creates a data frame directed to the host computer 5, in which it is described that it is not permitted to access, and transmits the newly created data frame to the switching device 111 (S818). Then, the newly created data frame is transmitted to the host computer 5 through the switching device 111.

On the other hand, if the received data frame is a data frame to be permitted the access, the storage device control unit 12 transmits the data frame to the switching device 111 (S819) and the switching device 111 relays the data frame to the second storage controller 20 (S820).

When the second storage controller 20 receives the data frame (S821), the second storage controller 20 executes data input and output corresponding to the SCSI command described in the FCP_CDB in the data frame to the logic volume described in the FCP_LUN in the data frame (S822). After executing the data input/output process, the second storage controller 20 transmits to the first storage controller 10 the data frame in which the result of the process and data read out from the logic volume etc. are described, when necessary (S823).

In this embodiment, combinations of Source_ID, Destination_ID and LUN that do not permit any data input/output process are described in the access limit management table, but instead, combinations of Source_ID, Destination_ID and LUN that permit data input/output processes may be described in the table. The access limit can be set in various forms including not only the case where access limit is executed for all the combinations of Source_ID, Destination_ID and LUN but also the case where it is executed for any one of Source_ID, Destination_ID and LUN or for a combination of any two or more of these.

As described above, the first storage controller 10 executes replacing the role of the second storage controller 20 processes relating to the access limit. Therefore, it is enough that the function for executing the access limit is implemented on the first storage controller 10. Therefore, the load of maintenance relating to the access limit function can be reduced by the amount to be created by providing such a mechanism to the second storage controller 20. Furthermore, because no access limit function needs to be included in the second storage controller 20, a storage controller having a lower processing capacity than the first storage controller 10 can be used as the second storage controller 20 and, therefore, this is effective for reducing of the introduction cost and the operation cost.

Furthermore, old types of storage controllers having lower performance compared to the newly introduced storage controllers can be fully used as second storage controllers 20. Yet furthermore, it is enough that the access limit management table is stored only in the first storage controller 10 and, therefore, reduction of the load of maintenance created by the unified management is progressed.

Priority Control

Next, the priority control function included in the first storage controller 10 will be described. The first storage controller 10 stores the priority management table shown in FIG. 9. In the priority management table, the relations of Destination_ID, Source_ID and the delay time are described. The delay time is used as, for example, a parameter for determining the starting time of execution of a process that may increase the load of processing of the microprocessor 121. The priority control function is a function that controls the order of execution of the data input and output corresponding to the data frame received by the first storage controller 10 from the host computer 5, according to the delay time set in the priority management table. The contents of the priority management table may be registered automatically by a function of the first storage controller 10 or may be registered in a manual operation by an operator.

Figure 10:
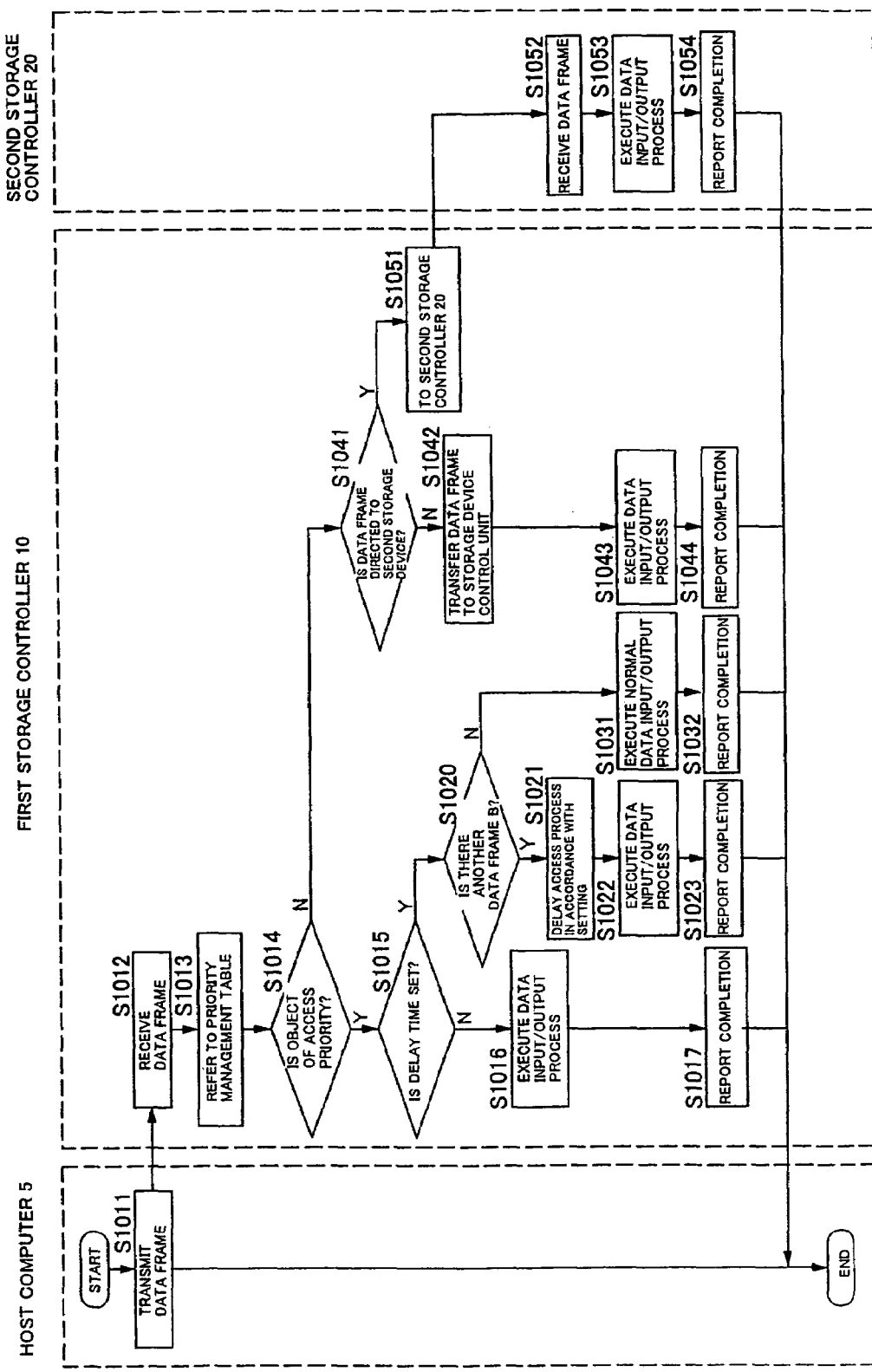
FIG. 10 is a flow chart illustrating a priority control function according to one embodiment of the present invention.

The priority control function will be described in detail referring to the flow chart shown in FIG. 10. When the first storage controller 10 receives a data frame A (S1012) transmitted from the host computer 5 (S1011), the first storage controller 10 checks whether the combination of Source_ID and Destination_ID in the data frame A exists in the priority management table or not (S1013, S1014).

If the combination exists, the first storage controller 10 determines the combination as the object for the access priority when a delay time is not set in the combination (S1015), executes data input and output for data frame A (S1016) and, after execution, transmits to the host computer 5 the data frame in which the report of completion is described (S1017).

If a delay time is set in (S1015), the first storage controller 10 checks whether another data frame B exists waiting to be processed in a queue managed by the control memory 123 in the storage device control unit 12 (S1020) and, if the data frame B exists waiting, causes the starting of execution of the process for data frame A stand by for the period of the delay time set in the priority management table corresponding to the contents of the data frame A (S1021). The starting time of which processes for the data frame should be delayed is adequately determined taking into consideration the load of processing imposed on the microprocessor 121 such that the data input/output process will be executed in an adequate order according to the needs of users. Arrangement may be such that the control of the order of executing processes using the delay time as a parameter can be determined automatically by the storage system or that the control of the order can be set by a user from a control terminal connected to the storage system. After the delay time has passed, the first storage controller 10 executes data input and output for data frame A (S1022) and transmits to the host computer 5 a data frame in which the report of completion is described (S1023).

On the other hand, in (S1020), if another data frame B does not exist waiting in the queue, the first storage controller 10 executes processes according to the ordinary procedure for data frame A described in the basic operation above. That is, if the data frame A is directed to the disk drive 14 in the first storage controller 10, data input/output process for the disk drive 14 is executed in the first storage controller 10 and, if the data frame is directed to the disk drive 21 in the second storage controller 20, the first storage controller 10 transmits the data frame to the second storage controller 20, and the second storage controller 20 executes a data input/output process directed to the disk drive 21 (S1031). In either cases, after the data input/output process has been completed, a report of completion is transmitted if necessary (S1032).

In (S1014), if the combination of Source_ID, Destination_ID of the data frame A does not exist in the priority management table, the first storage controller 10 checks, according to the procedure described in the above basic operation, whether the data frame A is directed to the disk drive 14 in the first storage controller 10 or to the second storage controller 20 (S1041). Now, if the data frame A is directed to the first storage controller 10, the data frame is transmitted to the storage device control unit 12 (S1042) and the storage device control unit 12 executes a data input/output process for the data frame A (S1043) and transmits to the host computer 5 a data frame in which a report of completion is described (S1044).

On the other hand, if the data frame A is directed to the disk drive 21 in the second storage controller 20, the first storage controller 10 transmits the data frame A to the second storage controller 20 (S1051). When the second storage controller 20 receives the data frame A (S1052), it executes a data input/output process directed to the disk drive 21 to the data frame A (S1053) and transmits a data frame, in which a report of completion is described, to the host computer 5 through the first storage controller 10 (S1054).

As understood from the above description, the priority control of data frames in the host computer 5 is dedicatedly executed in the first storage controller 10. That is, from another point of view, the first storage controller 10 executes replacing the role of the second storage controller 20 the priority control of the second storage controller 20. That is, it is enough that a priority control function is implemented on the first storage controller 10, and the second storage controller 20 can enjoy a function corresponding to the priority control function without having a mechanism for the function.

Furthermore, the load of operation can be reduced for the second storage controller 20 by the amount to be created by providing a mechanism for the priority control. Yet furthermore, it becomes possible to provide a function of priority control in the forms including the disk drive 21 in the second storage controller 20 even if a storage controller having a lower process capacity than that of the first storage controller 10 is used as the second storage controller 20 and, therefore, the introduction cost and the operation cost can be reduced.

Yet furthermore, old types of storage controllers having lower performance compared to the newly introduced storage controllers can be fully used as second storage controllers and, therefore, effective uses of resource and reduction of operation cost are progressed. In addition, it is enough that the priority management table is stored only in the first storage controller 10 and, therefore, reduction of the load of maintenance created by the unified management is progressed.

Though the priority control function for one LUN has been described as above, it can be arranged that a priority control is executed directing a plurality of LUNs and physical ports in a process described in one data frame.

Data Copy Control

In a storage system of the present invention, a copy management of data is conducted in a way in which a copy of the data stored in a logic volume (hereinafter referred to as "main logic volume") to which the first storage controller 10 executes data input/output processes is also stored in a logic volume (hereinafter referred to as "sub-logic volume") in the second storage controller 20. The relation between the LUN in the main logic volume and the LUN in the sub-logic volume is stored in the control memory 113 in the first storage controller 10 as a pair management table. An example of the pair management table is shown in FIG. 11. However, the relation may be automatically set by a function of the first storage controller 10 or may be set in a manual operation by an operator etc.

Figure 12:
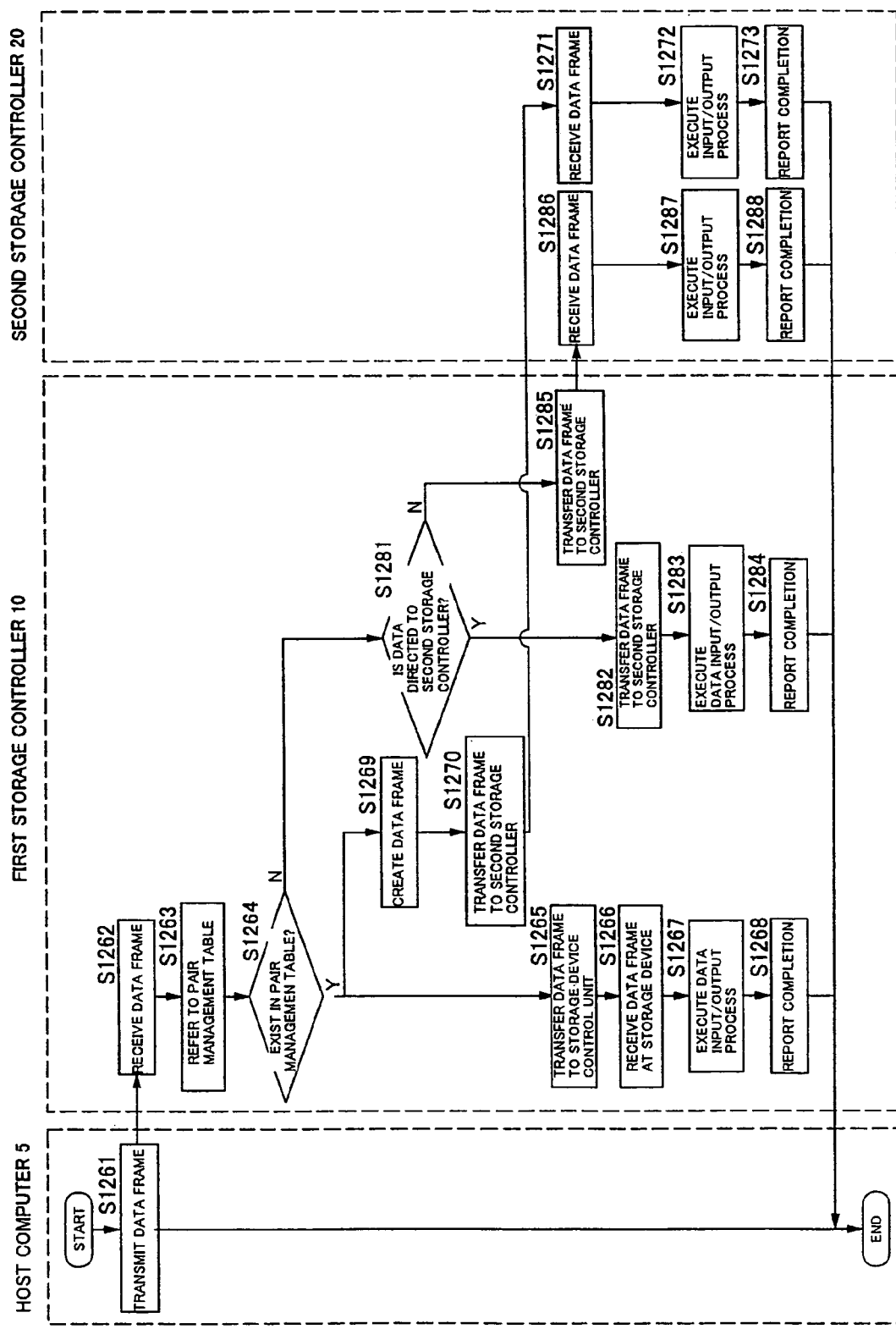
FIG. 12 is a flow chart illustrating the processing of the storage system according to one embodiment of the present invention when a data frame is transmitted in which a data writing request for a main logic volume is described.

Now, a process of the storage system while a data frame in which a data writing request directed to the main logic volume is described is transmitted from the host computer 5 to the first storage controller 10 will be described referring to a flow chart shown in FIG. 12.

When the first storage controller 10 receives the data frame (S1262) transmitted from the host computer 5 (S1261), it checks whether an LUN described in the data frame as FCP_LUN (91) exists in the pair management table (S1263, S1264).

If the LUN described in the data frame as FCP_LUN (91) does not exist in the pair management table, the first storage controller 10 transmits the received data frame to the storage device control unit 12 (S1265). When the storage device control unit 12 receives the data frame (S1266), it executes to the proper logic volume a data writing process corresponding to the SCSI command described in the data frame (S1267) and, when necessary, transmits to the host computer 5 a data frame in which a report of completion is described (S1268). Therefore, data has been written in the main logic volume.

In (S1264), if the LUN exists in the pair management table, the first storage controller 10 creates a new data frame in which the Destination_ID (81) and the FCP_LUN (91) of the data frame is changed such that they designate the sub-logic volume being the destination of copying (S1269). The creation of the new data frame is executed in a way in which, after the received data frame has been stored in the control memory 113, the copy of the data frame is stored in the control memory and the Destination_ID (81) and the FCP_LUN (91) in the copy of the data frame are changed to create a new data frame.

Next, the first storage controller 10 transmits the created new data frame to the second storage controller 20 by controlling the switching device 111 to cause the switching device 111 to do so (S1270). When the second storage controller 20 receives the data frame (S1271), it executes a data writing process corresponding to the SCSI command described in the FCP_CDB of the data frame, to the sub-logic volume described in the FCP_LUN of the data frame (S1272). In this way, data being a copy of the data described in the main logic volume has been also written in the sub-logic volume. After the data writing process has been executed, the second storage controller 20 transmits to the host computer 5 a data frame in which a report of completion is described if necessary (S1273). In this way, data has been written in the main logic volume and, simultaneously, the same data has been written in the sub-logic volume.

On the other hand, in (S1264), if the LUN described in the data frame as the FCP_LUN (91) does not exist in the pair management table, the first storage controller 10, following the procedure described in the above basic operation, checks whether the data frame is directed to the disk drive 14 in the first storage controller 10 or is directed to the second storage controller 20 (S1281). If the data frame is directed to the first storage controller 10, the data frame is transmitted to the storage device control unit 12 and the data writing process about the data frame is executed (1282). A data frame in which a report of completion is described is transmitted to the host computer 5 if necessary (S1284).

If the data frame is directed to the disk drive 21 in the second storage controller 20, the first storage controller 10 transmits the data frame to the second storage controller 20 (S1285). When the second storage controller 20 receives the data frame (S1286), it executes a data writing process directed to the disk drive 21 (S1287). Then, the second storage controller 20 transmits to the host computer 5 through the first storage controller 10 a data frame in which a report of completion of the data writing process is described if necessary (S1288).

In the above processes, when the first storage controller 10 receives a data frame in which a data writing request directed to the main logic volume is described, the first storage controller 10 creates a data frame for copying the request and transmits it to the second storage controller 20.

According to this method, a mechanism of data copy management, in which data stored in the disk drive 14 in the first storage controller 10 is also stored in the disk drive 21 in the second storage controller 20, can be easily realized only by providing a mechanism for creating a data frame as described above to the first storage controller 10.

There are two schemes for data copy management known such as so-called "synchronized scheme" in which the first storage controller 10 having received the data frame notifies the host computer 5 of a report of completion after confirming the completion of the writing processes for both of the main logic volume and the sub-logic volume, and so-called "non-synchronized scheme" in which the first storage controller 10 notifies the host computer 5 of the report of completion only when the writing process to the main logic volume has been completed regardless of whether the writing process to the sub-logic volume has been completed or not. However, the mechanism of the above-described embodiment can be applied to the case operated in either the "synchronized scheme" or the "non-synchronized scheme".

Although the storage system control method, etc., according to the present invention have been set forth by way of several embodiments, the above embodiments are only to facilitate the understanding of the present invention but are not intended to limit the present invention. It will be appreciated that the present invention can be variously changed or improved without departing from the spirit thereof and that the present invention covers equivalents thereof. Only one of the functions of access limit, priority, data copy control described above may be applied or any combination of two or more of these may be applied.

The communication protocol used for the first communication means or the second communication means is not limited to the Fiber Channel Protocol, but instead other protocols may be used.

In the above embodiments, a disk array apparatus has been described as an example of the storage apparatus. The present invention is however applicable to other storage apparatuses than the disk array apparatus, such as a semiconductor disk apparatus.

Although the present invention has been described above based on the embodiments, it is to be noted that the present invention shall not be limited to the embodiments stated herein, and that various modifications can be made without departing from spirit of the invention.

What is claimed is:

1. A method for controlling a storage system including:
a host computer;
a first storage controller, connected communicably to said host computer, for receiving a data frame transmitted from said host computer and executing data input to and data output from a first storage device in response to a data input/output request described in said data frame; and
a second storage controller connected communicably to said first storage controller,
the method comprising:
relaying by said first storage controller, upon receipt of said data frame transmitted from said host computer, said data frame to said second storage controller in response to information described in said data frame,
wherein said data frame is a data frame conforming to Fiber Channel Protocol, and said relaying is conducted by a Fiber Channel switch included in said first storage controller,
wherein said data frame includes therein as said information, at least one of:
information from specifying a Fiber Channel port of a source of said data frame,
information for specifying a Fiber Channel port of a destination of said data frame, and
information for specifying storage devices,
wherein said first storage controller stores access limit information indicating permission/rejection of an access of said Fiber Channel port of the source to said Fiber Channel port of the destination or to a storage device of the destination;
by said first storage controller, when receiving said data frame from said host computer, referring to said access limit information to check whether said Fiber Channel port of the source of said data frame is permitted to make access to said Fiber Channel port of the destination or to said storage device of the destination; and
relaying by said first storage controller said data frame to said second storage controller only when said access is permitted,
wherein said first storage controller of said first storage device virtualizes a logical volume of a second storage device,
wherein when the first storage controller receives an access to virtualized logical volume from the host computer, the first storage controller controls permission of access according to a relationship between the host computer and the logical volume,
wherein the first storage controller allows and relays the access to the second storage device, if the access is destined for a logical volume to which access is permitted from the host computer, and
wherein the first storage controller denies the access, if the access is destined for a logical volume to which access is not permitted from the host computer.

2. A method for controlling a storage system including:
a host computer;
a first storage controller, connected communicably to said host computer, for receiving a data frame transmitted from said host computer and executing data input to and data output from a first storage device in response to a data input/output request described in said data frame; and
a second storage controller connected communicably to said first storage controller,
the method comprising:
relaying by said first storage controller, upon receipt of said data frame transmitted from said host computer, said data frame to said second storage controller in response to information described in said data frame,
wherein said data frame is a data frame conforming to Fiber Channel Protocol, and said relaying is conducted by a Fiber Channel switch included in said first storage controller;
wherein said information of said data frame is at least one of:
information for specifying a Fiber Channel port of a source of said data framer,
information for specifying a Fiber Channel port of a destination of said data frame, and
information for specifying storage devices;
wherein said first storage controller stores information indicating priority of a data input/output process corresponding to said data frame, by relating to a combination of said Fiber Channel port of the source and said Fiber Channel port of the destination; and
by said first storage controller, when receiving said data frame from said host computer, executing a data input/output process for said storage device connected to said port of the destination of said data frame, in conformity with said information indicating said priority,
wherein said first storage controller of said first storage device virtualizes a logical volume of a second storage device,
wherein when the first storage controller receives an access to virtualized logical volume from the host computer, the first storage controller controls permission of access according to a relationship between the host computer and the logical volume,
wherein the first storage controller allows and relays the access to the second storage device, if the access is destined for a logical volume to which access is permitted from the host computer, and
wherein the first storage controller denies the access, if the access is destined for a logical volume to which access is not permitted from the host computer.

3. A method for controlling a storage system according to claim 2, wherein said information indicating priority is information indicative of timing to execute the data input/output process for said storage device.

4. A storage controller comprising:
means connected communicably to a host computer, for receiving a data frame transmitted from said host computer and executing data input to and data output from a first storage device in response to a data input/output request described in said data frame;
means connected communicably to another storage controller, for receiving a data frame and executing data input to and data output from a second storage device in response to a data input/output request described in said data frame;
means for, when receiving a data frame transmitted from said host computer, relaying said data frame to said another storage controller in response to information described in said data frame,
wherein said data frame is a data frame conforming to Fiber Channel Protocol, and said relaying is conducted by a Fiber Channel switch included in said storage controller;
wherein said information is at least one of:
information for specifying a Fiber Channel port of a source of said data frame,
information for specifying a Fiber Channel port of a destination of said data frame, and
information for specifying storage devices;
means for storing information indicating priority of a data input/output process corresponding to said data frame, by relating to a combination of said Fiber Channel port of the source and said Fiber Channel port of the destination; and
means for, when receiving said data frame from said host computer, executing a data input/output process for said storage device connected to a port of the destination of said data frame, in conformity with said information indicative of priority,
wherein said first storage controller of said first storage device virtualizes a logical volume of a second storage device,
wherein when the first storage controller receives an access to virtualized logical volume from the host computer, the first storage controller controls permission of access according to a relationship between the host computer and the logical volume,
wherein the first storage controller allows and relays the access to the second storage device, if the access is destined for a logical volume to which access is permitted from the host computer, and
wherein the first storage controller denies the access, if the access is destined for a logical volume to which access is not permitted from the host computer.

* * * * *